United States Patent [19]

Deal

[11] Patent Number: 5,314,095
[45] Date of Patent: May 24, 1994

[54] DEVICE FOR THE METERING OF GRANULAR OR POWDERED PRODUCTS

[75] Inventor: Michel Deal, Saint Remy En Rollat, France

[73] Assignee: Sedepro, Paris, France

[21] Appl. No.: 724,825

[22] Filed: Jul. 2, 1991

[30] Foreign Application Priority Data

Jul. 12, 1990 [FR] France .................. 90 09012

[51] Int. Cl.⁵ .............. G01F 11/20; G01F 13/00
[52] U.S. Cl. ................. 222/218; 222/221; 222/349
[58] Field of Search ........... 222/218, 221, 345–347, 222/368, 349–352, 342; 221/233, 234; 141/91, 259

[56] References Cited

U.S. PATENT DOCUMENTS

| 917,378 | 4/1909 | Swindell | 222/218 |
|---|---|---|---|
| 1,069,083 | 7/1913 | Gibson | 222/218 X |
| 1,185,505 | 5/1916 | Hill | 222/218 X |
| 1,431,582 | 10/1922 | Hanson | 222/218 |
| 1,839,697 | 1/1932 | Norris | 222/350 X |
| 3,353,722 | 11/1967 | Mehta | 222/218 |
| 3,794,234 | 2/1974 | Pardo | 222/218 |
| 4,009,788 | 3/1977 | Waldhofer | 222/218 X |
| 4,047,901 | 9/1977 | Baron et al. | 222/218 X |
| 4,634,026 | 1/1987 | Suay Puig et al. | 222/218 |
| 4,778,079 | 10/1988 | Judex | 222/218 X |

FOREIGN PATENT DOCUMENTS

| 0015855 | 9/1980 | European Pat. Off. . | |
|---|---|---|---|
| 0368026 | 5/1990 | European Pat. Off. . | |
| 242932 | 2/1910 | Fed. Rep. of Germany | 222/218 |
| 2748959 | 5/1979 | Fed. Rep. of Germany | 222/218 |
| 2423757 | 11/1979 | France . | |

Primary Examiner—Andres Kashnikow
Assistant Examiner—Kenneth DeRosa
Attorney, Agent, or Firm—Brumbaugh, Graves, Donohue & Raymond

[57] ABSTRACT

The material to be metered fills the cylinder 1 when it is in front of the admission orifice 31, whereupon the cylinder 1 moves opposite the delivery orifice 32 where the piston 2 describes a movement towards top dead center in order to eject said material out of the cylinder 1. The cylinder 1 then moves towards the admission orifice while the piston 2 remains at top dead center to avoid any return flow, whereupon the cycle starts over again.

13 Claims, 6 Drawing Sheets 5,314,095

DEVICE FOR THE METERING OF GRANULAR OR POWDERED PRODUCTS

BACKGROUND OF THE INVENTION

The present invention relates to the quantitative metering of granular or powdered products.

The metering of products, by weight or by volume, has numerous applications in industry. In certain cases, it is highly desirable that the weight or volume measurement can be effected continuously. While continuous quantitative metering has been fully mastered in the case of liquid products, this is not true in the case of products which are in powder or even granular form. Numerous systems of quantitative metering which operate, in particular, on the basis of weighings are already known. However, all the known metering techniques have recourse to automatic control, to complex instrumentation, or to attached calculation means, making the systems complicated, bulky, expensive and/or unreliable in an industrial atmosphere or poorly adapted to operate at variable rates. Furthermore, the volumetric systems raise difficulties with respect to the filling and removal of the unit metered volume or do not lend themselves to operation at high rates.

SUMMARY OF THE INVENTION

The present invention proposes a simple, reliable and very precise device for the quantitative metering of such products.

The object of the present invention is to provide a volumetric metering device which lends itself to continuous operation and, therefore, has a very small unit volume as compared with the quantities to be metered so as to be able to operate continuously and at high rates.

Another object of the present invention is to propose a metering device of this kind which can deliver the metered products under elevated pressure so as to be compatible with a very large range of applications.

According to the invention, the metering device for granular or powdered products comprises at least one piston which sweeps a given volume sliding within a cylinder developed in a moveable body which moves within a housing between an admission position in which the products to be metered fill said swept volume, and a delivery position which is different from the admission position and in which the products to be metered are evacuated from said swept volume, said piston being scraped by said housing when it leaves the delivery position.

In order to avoid any interruption in the feeding of the metering device, the latter preferably has a force filling member just upstream of the admission orifice for the product to be metered. The force filling member causes a stirring of the product so as to prevent the latter from becoming stationary, in particular as a result of arching.

DESCRIPTION OF THE DRAWINGS

The following figures illustrate one application of the device of the invention for metering products used in the rubber processing industries, in particular carbon black and sulfur.

DESCRIPTION OF THE PREFERRED EMBODIMENTS

Figure 1:
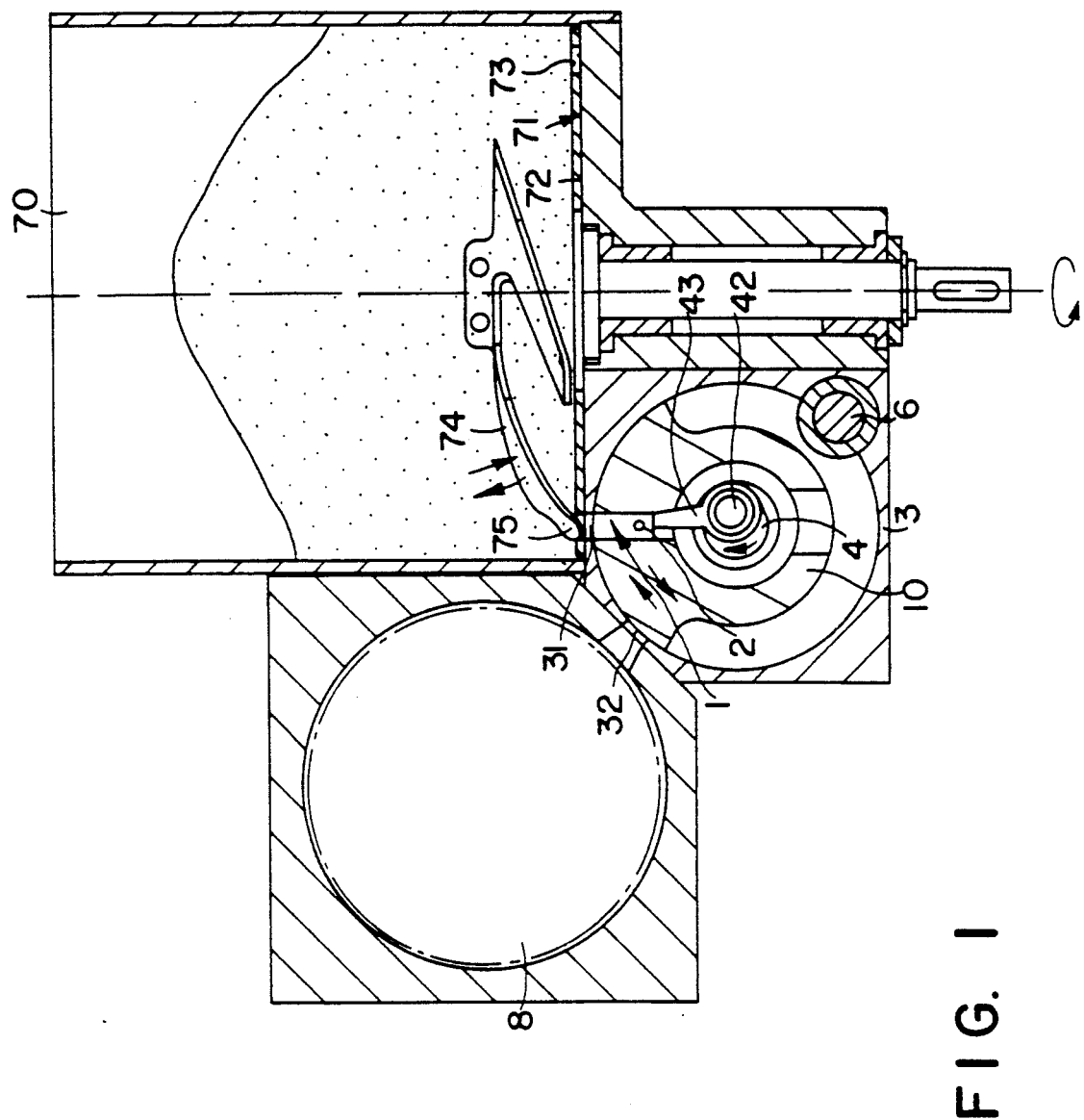
FIG. 1 is an overall sectional elevation of device embedding the present invention.

The metering element proper is a cylinder 1 within which a piston 2 slides. The stroke of the piston 2 defines a given swept volume which constitutes the minimum quantity of material which can be metered. The cylinder 1 is arranged in a moveable body within a housing 3. The body can pass from an admission position to a delivery position.

At the admission, the piston 2 is opposite the feed orifice 31 which is pierced through the housing 3, and the piston passes from top dead center to bottom dead center in order to fill the swept volume with the powdered or granular product to be metered, which will be referred to very generally as "material" in the balance of the description. When the swept volume is entirely filled, the unit consisting of the cylinder 1 and the piston 2 moves towards the delivery position, which has the effect of occluding the cylinder 1 and thus defining the unit metered volume corresponding to the swept volume of the device.

The cylinder 1 having arrived opposite the delivery orifice 32, which is also pierced through the housing 3, the piston 2 passes from bottom dead center to top dead center, which ejects the material out of the cylinder 1. When the cylinder is entirely empty, the unit consisting of cylinder 1 and piston 2 is displaced towards the admission position. In order to be certain that no material remains in the cylinder 1 when the latter leaves the delivery position, the piston 2 is scraped by the housing. The cylinder is therefore isolated from the metered material and no return movement of said material is possible.

The operating principle having been explained, the metering device of the invention will now be explained in further detail.

Figure 2:
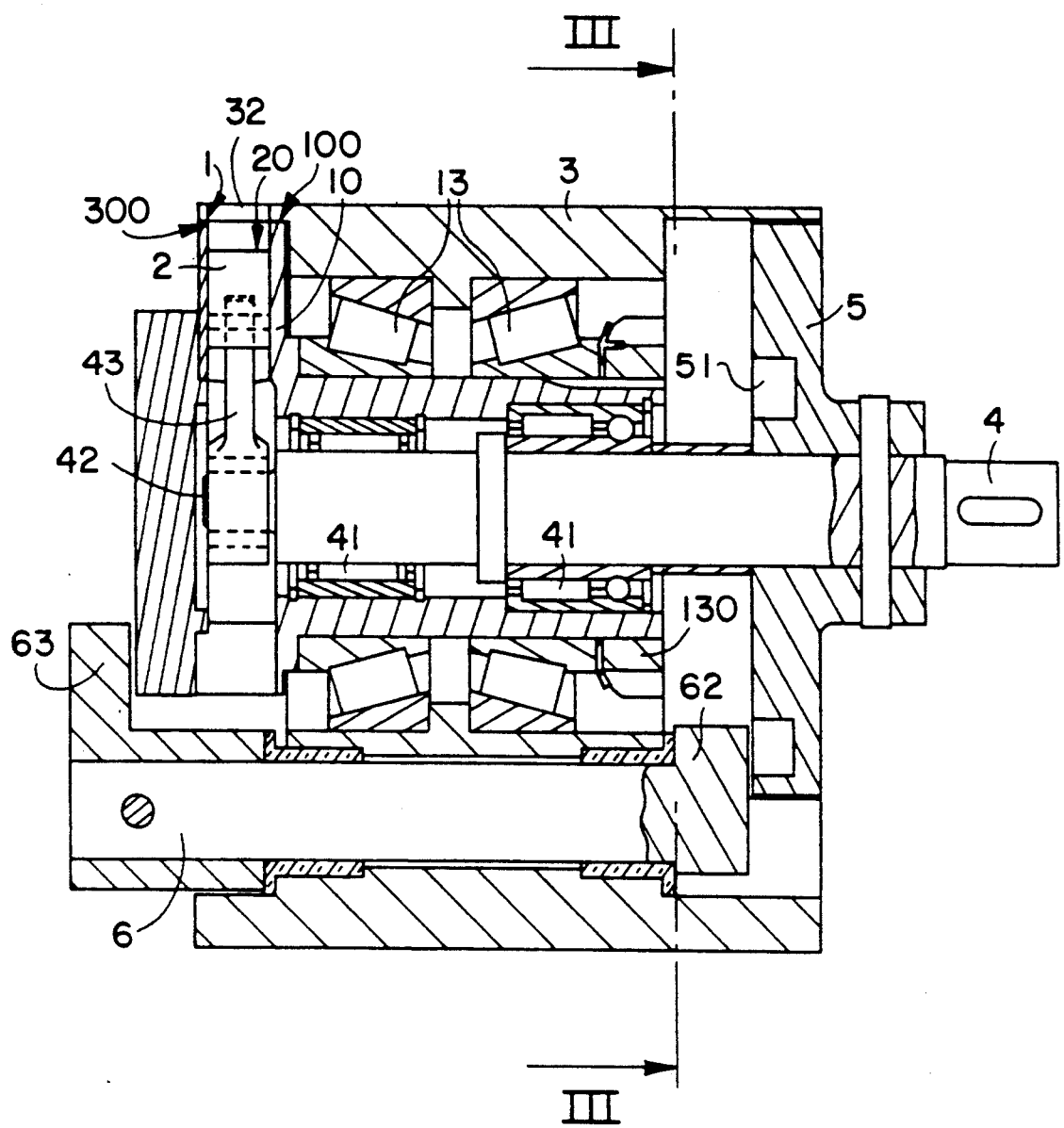
FIG. 2 is a section through the metering part of the device taken along the line II—II of FIG. 4.
Figure 4:
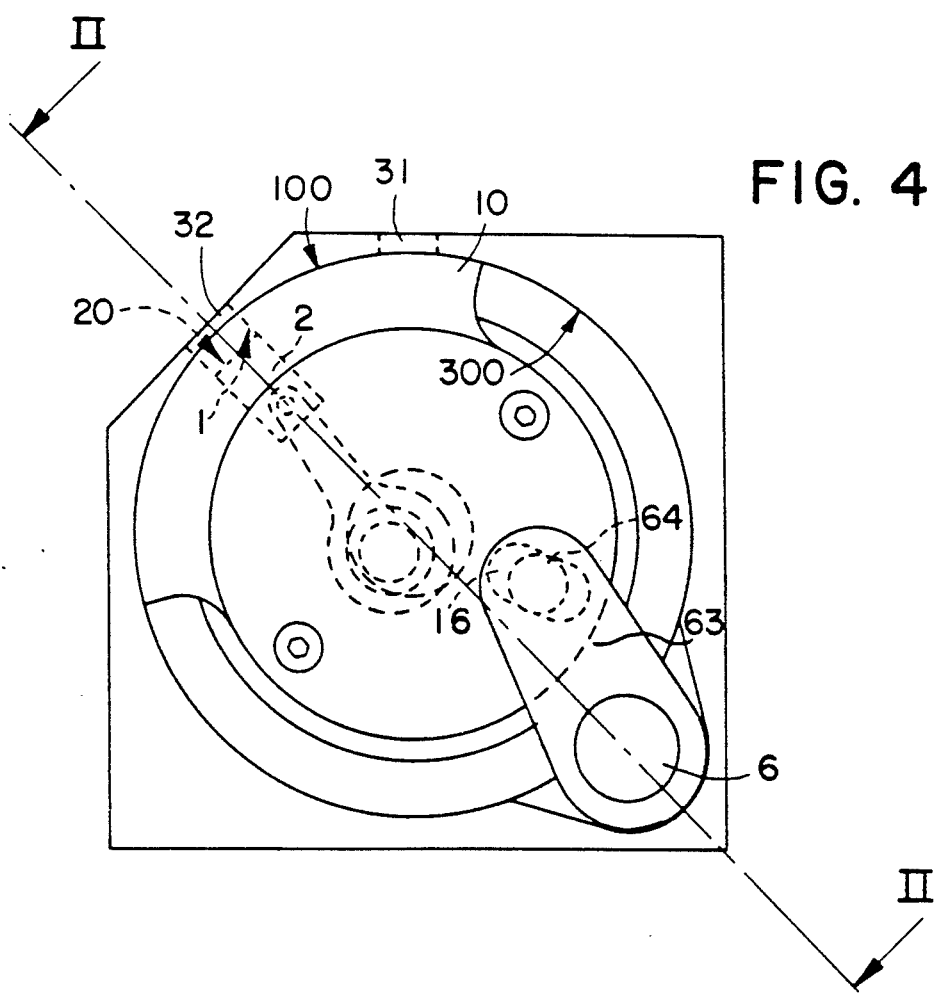
FIG. 4 is a view of a side of the section shown in FIG. 2.

It is noted that the movement between the admission, which position is illustrated in FIG. 1, and the delivery, which position is illustrated in FIG. 4, is a circular arc. The cylinder 1 is therefore developed in an oscillating moveable body 10, itself arranged in a housing 3 which surrounds all of the members effecting the metering. An inner cylindrical surface 300 (see FIG. 2) is machined in the housing 3. The oscillating body 10 comprises an outer cylindrical surface 100. The oscillating body 10 is mounted in the housing 3 in such a manner as to obtain a very small functional clearance between these two parts at the surfaces 100 and 300. This slight clearance is to assure tightness of the device and its proper operation. For this purpose, the oscillating body 10 is mounted within the housing 3 on two roller bearings 13 with conical tracks (or other types of preloaded bearings) clamped by the ring 130, which permits rotation without radial play due to the bearings, and without tilting of the oscillating body 10 within the housing 3.

The cylindrical surface 300 is pierced by two orifices provided through the housing 3, namely, the feed orifice 31 and the delivery orifice 32. When the piston 2 is at top dead center in the oscillating body 10, the upper face 20 of said piston 2 is flush with the surface 100 of the oscillating body 10. This upper face 20 is therefore itself cylindrical in order to assure perfect continuity of the cylindrical surface 100 and therefore tightness when the piston 2 leaves the delivery position to disappear below the housing 3. This arrangement is very important and provides assurance that the swept volume is entirely empty at the start of the following cycle, as is indispensable in order to achieve high precision. It makes it possible to obtain the effect of scraping of the piston by the housing, as mentioned above.

The reciprocating movement of the piston 2 between its top dead center and its bottom dead center is imparted by an input shaft 4 arranged within the oscillating body 10 and concentric with respect to the movement of the oscillating body 10 in the housing 3. The input shaft 4 is borne by bearings 41 and has, at its end, a crank pin 42 which is eccentric by an amount equal to one-half of the stroke of the piston 2. The crank pin 42 acts on a connecting rod 43 connected to the piston 2.

The oscillatory movement of the oscillating body 10 must, of course, be coordinated with the reciprocating movement of the piston 2. It is controlled by a double-acting cam 5 keyed onto the said input shaft 4. The guide path 51 comprises two sections in the shape of a circular arc, one of small radius corresponding to the admission position and the other of large radius corresponding to the delivery position and, between said sections, connecting portions which control the oscillating movement of the oscillating body 10.

Figure 6:
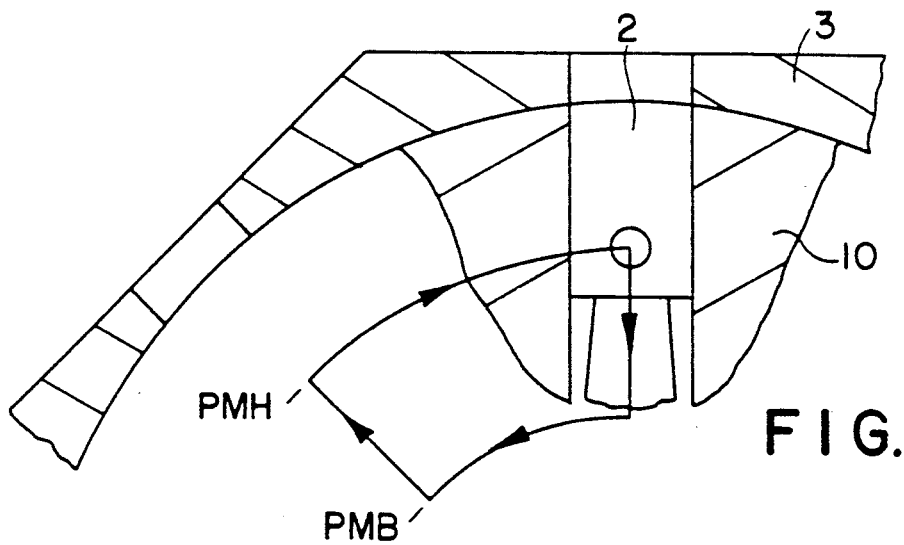
FIG. 6, 7 and 8 illustrate different variants of the operating cycle.

FIG. 6 diagrammatically shows the theoretical cycle of the metering device. It is important that the piston 2 be at top dead center before the start of the movement of the oscillating body 10 towards the admission, and remain there at least until it is no longer in contact with the delivery orifice 32. Thereupon the movements of the piston in the oscillating body and of the oscillating body with respect to the housing must be controlled by means which, as a whole, assure the immobility of the piston in the oscillating body, at least while the oscillating body leaves the delivery position, the piston being at that time at its top dead center. It is also important that the piston 2 be at bottom dead center well before the swept volume is completely isolated from the admission orifice 31 by the movement of the oscillating body 10 towards the delivery.

Figure 7:
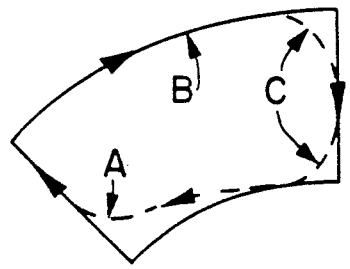

In order to make the operation of the device smoother, certain differences from the theoretical movements previously explained can be tolerated. FIG. 7 diagrammatically shows an actual cycle which is suitable for a compressible material: the cycle comprises rounded portions suitable for operation at a very high rate. For example, the movement of the piston 2 towards top dead center can commence slightly before the swept volume is in contact with the delivery orifice 32 when the nature of the material metered permits it to withstand a slight compression. This makes it possible to design less steep slopes in the roller path 51: the portion A of the curve thus differs rather clearly from the theoretical cycle. During the portion B, the shaft 4 turns at the same angular speed as the oscillating body 10: the piston 2 remains stationary in the oscillating body 10. The roundings at C soften the movement: the piston 2 remains stationary in the oscillating body 10, without prejudice to the precision of the metering device.

Figure 8:
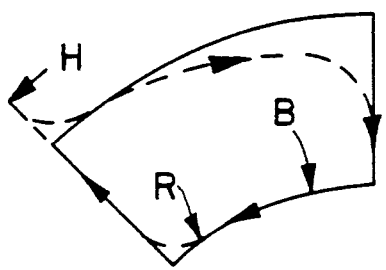
Figure 9:
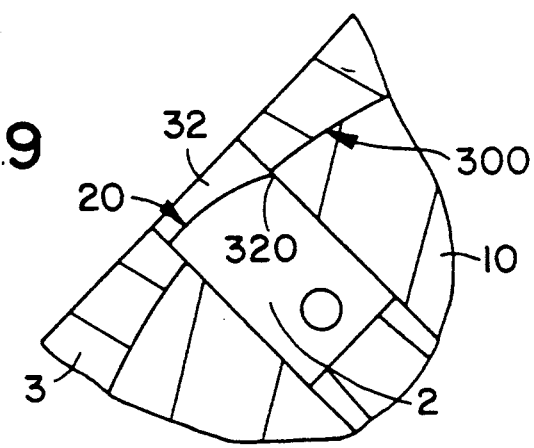
FIGS. 9, 10 and 11 show a detail of an embodiment corresponding to the cycle of FIG. 8.
Figure 10:
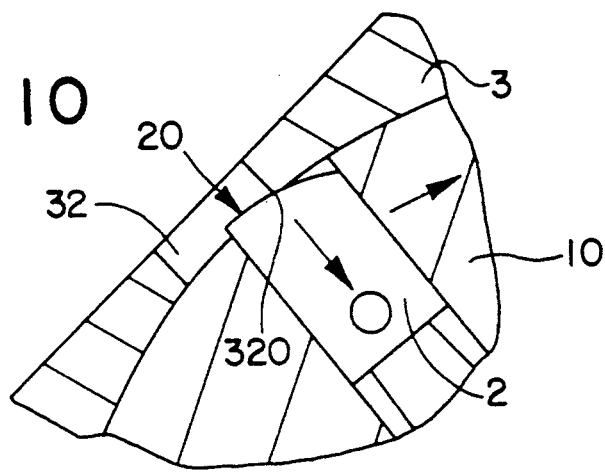
Figure 11:
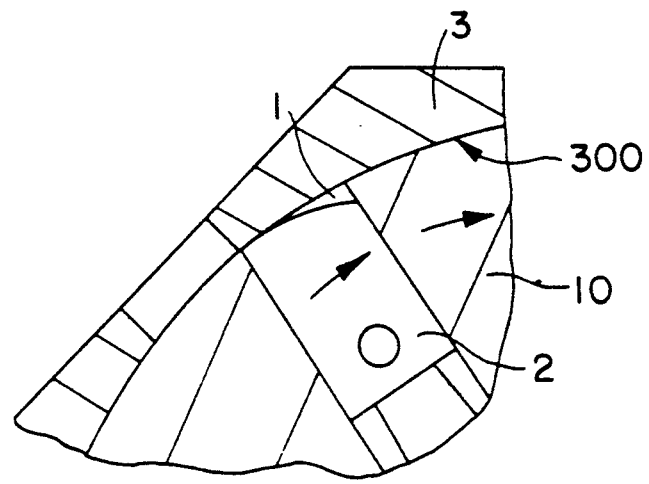

FIG. 8 shows an actual cycle which is suitable for a non-compressible material. During the portion B of the cycle, the shaft 4 turns at the same angular speed as the oscillating body 10. At the point R, the delivery orifice is at least partially in communication with the material contained in the cylinder 1: the piston 2 can start its delivery movement, which continues up to H, in which position the piston 2 penetrates into the delivery orifice 32. Its upper face 20, therefore, extends beyond the level corresponding to the cylindrical surface 300 of the housing 3: the piston emerges from the oscillating body 10 in order to favor the delivery of the metered material, for instance in order to favor its incorporation in another material. The upper face 20 of the piston 2 itself is of a suitable shape so that, taking into account the relative movement of the piston 2 with respect to the housing 3, it is scraped by the edge 320 of the housing 3, as is clearly shown in FIG. 10. When the cylinder 1 is entirely occluded by the cylindrical surface 300 (FIG. 11), the piston 2 may or may not be immovable with respect to the oscillating body. The diagram of FIG. 8 corresponds to the case in which the piston continues to descend in the cylinder 1.

Figure 3:
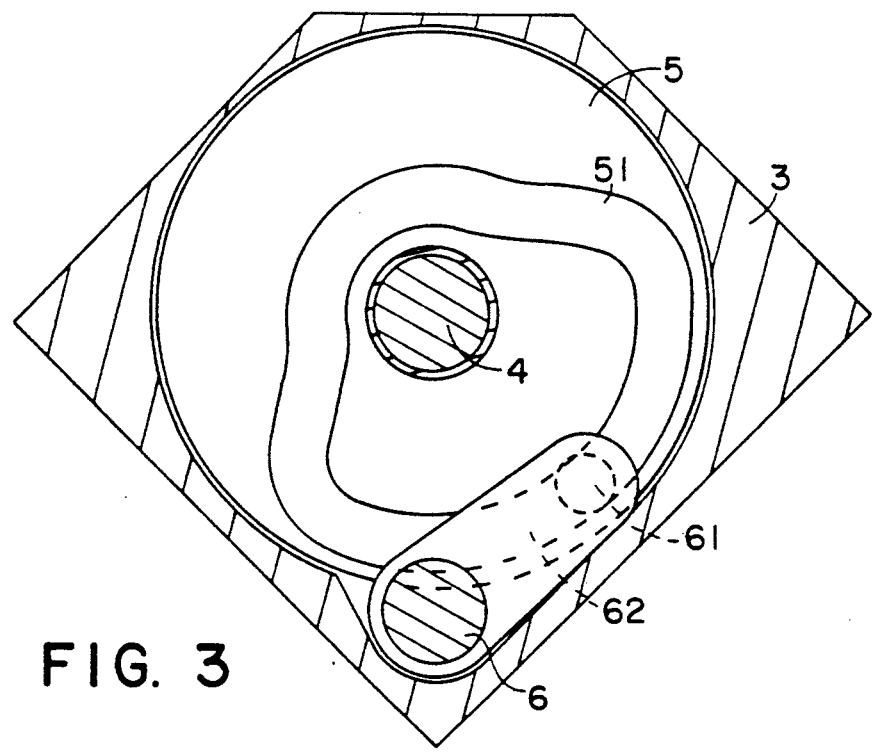
FIG. 3 is a section along the line III—III of FIG. 2.

The raceway 51 (see FIG. 3) receives a roller 61 borne by an arm 62 articulated on the housing 3. The arm 62 is connected to a return shaft 6, mounted in the housing 3 in order to transmit the oscillating movement of the arm 62 to a second arm 63. The second arm 63 bears a second roller 64, which is engaged in a groove 16 developed in the oscillating body.

Thus, the inlet shaft 4 imparts all the desired movements by two kinematic chains: the one comprises a connecting rod - crank system (connecting rod 43 and eccentric crank pin 42) to control the reciprocating movement of the piston 2, and the other comprises a double-acting cam system 5 and return shaft 6 to control the oscillation of the oscillating body 3. It is important to note that since the double-acting cam 5 acts on the position of the oscillating body 10 with respect to the input shaft 4, it acts on the position of the cylinder 1 with respect to the crank pin 42 and therefore on the position of the piston 2 itself in the cylinder 1. As these two kinematic chains act one on the other, it is possible to design a device the movement of which comprises four times which are clearly separated: first of all, a pure movement of descent of the piston 2 in its cylinder 1 during the admission, then a movement of swinging of the oscillating body from the admission position to the delivery position, the piston 2 remaining stationary in the cylinder 1, then a movement of rising again of the piston 2 in the oscillating body 10, the latter remaining stationary in the housing 3, and finally a return towards the admission position without movement of the piston 2 in the oscillating body 3. However, in practice, the movements, at least in certain phases as has been detailed above, can overlap slightly without impairing the precision of the device.

The feeding of the material to be metered to the cylinder 1 can be effected simply by gravity, by arranging the cylinder substantially vertically in admission position and attaching a hopper above the admission orifice 31. However, in the case of certain powdered materials, including carbon black or sulfur, this may not be sufficient to assure operation with high precision. It is preferable to provide a force-feed member which fills the cylinder 1 in the feed position.

Figure 5:
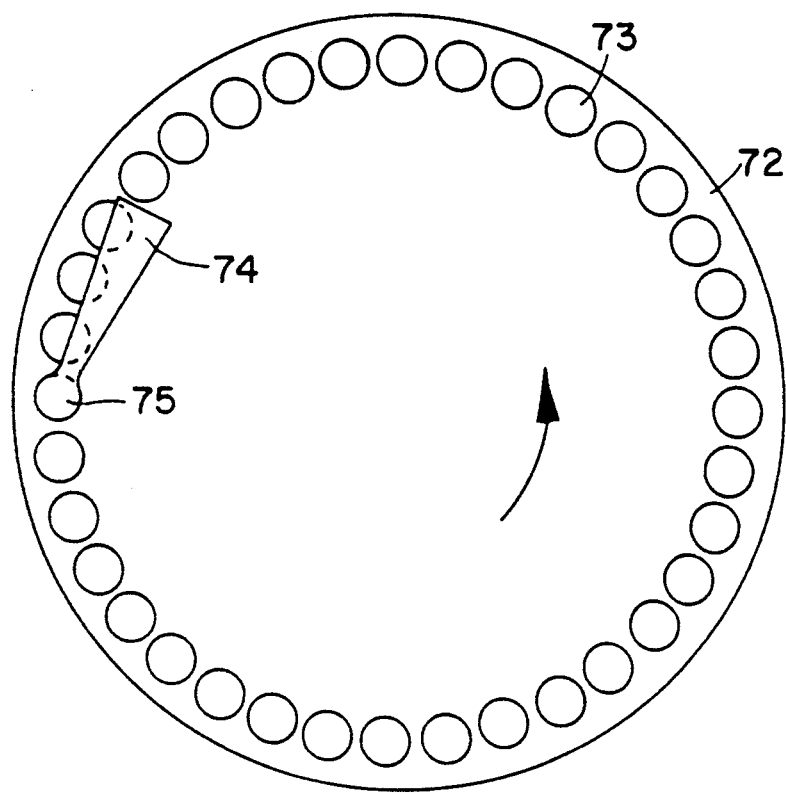
FIG. 5 shows a member of the machine.

It can be noted in FIG. 1 that this force-feed member consists essentially of a reservoir 70 feeding the cylinder 1 by gravity, said reservoir having a circular bottom 71 on the edge of which the said feed orifice 31 appears. Stirring means are arranged at least in the vicinity of said bottom 71 so as to drive the material towards the feed orifice. By reference to FIGS. 1 and 5, it is seen that the stirring means are formed of a disk 72 pierced with holes 73 of a diameter corresponding to that of the cylinder 1, said holes being arranged on a circle having a radius such that they all pass in succession opposite the feed orifice, and of a flexible blade 74, mounted fixed in the reservoir and provided with a head 75 arranged opposite the admission orifice 31 so as to deliver the material arranged into said holes 73 when each of them passes in front of the admission orifice 31. This head 75 presses with a constant force in the direction of the cylinder 1, which also contributes to assuring high precision and a high reproducibility of operation of the metering device, by effecting within the cylinder 1 a compacting which is at all times identical, whatever the conditions of incorporation of the products to be metered in the reservoir 70.

The force-feed member effects a conditioning of the material. It also participates in the precision of the metering device. It has been found that it is desirable for the speed of rotation of the disk 72 to be proportional to the speed of rotation of the input shaft 4. Due to this, the metering of materials such as sulfur or carbon black, which are very sensitive to the atmospheric conditions prevailing upon storage, is very reproducible and independent of the initial conditions under which the material is introduced into the reservoir 70.

In order to avoid any blocking in the reservoir 70, as might occur with certain materials due to an arching effect, one can, of course, add agitators (not shown) within the reservoir 70.

It should be noted that, in general, it is desired to meter a given weight of material, for instance it is desired to incorporate a given weight of carbon black in a given weight of rubber. It is sufficient to proceed with a calibration for each type of material to be metered; it has been found that, in this way, a weight measurement is obtained through a volume measurement in reproducible fashion.

The metering device permits the arrangement, just downstream of the delivery orifice, of an enclosure 8 for the incorporation and mixing, even if the material is to be delivered under pressure, and possibly high pressure, which makes it possible to contemplate a very wide range of applications.

For example, the device can be used for introducing into the enclosure 8 powdered products which participate in the production of a rubber mix, the mixing being effected continuously in the enclosure 8. The method of mixing the raw rubber consists in continuously introducing an elastomer into a mixing enclosure 8 and continuously incorporating precisely metered powdered products into said enclosure, and it is characterized by the fact that the metering of the said powdered products is effected by at least one piston 2 which sweeps through a given swept volume, sliding in a cylinder 1 developed in a moveable body which moves in a housing 3 between an admission position in which the products to be metered fill said swept volume, and a delivery position which is different from the admission position and in which the products to be metered are evacuated from said swept volume, the said piston 2 being scraped by the said housing 3 when it leaves the delivery position.

I claim:

1. A metering device comprising a housing having admission and delivery ports, a body movable within the housing and having a cylinder formed therein, at least one piston sweeping a given swept volume which piston slides within the cylinder, the cylinder moving between the admission port in which the products to be metered fill said swept volume and the delivery port, which is different from the admission port and in which the products to be metered are evacuated from said swept volume, said piston being scraped by said housing when the piston leaves the delivery port, and force-feed means above the admission port which force-feed means includes means to supply the products to be metered to the admission port and a head pressing with constant force in the direction of feeding of the cylinder providing controlled compaction of the products within the cylinder.

2. A device according to claim 1, characterized by the fact that said body is an oscillating body having a rotary movement so that the cylinder describes a circular arc between the admission and delivery ports and in which the means for supplying the products to the admission port include apertured means having a succession of apertures which move across the admission port and beneath said head whereby the head forces the products in each successive aperture toward the cylinder.

3. A metering device comprising a housing, an oscillating body mounted for rotation within said housing, a cylinder within the body, at least one piston which slides within the cylinder sweeping a given volume of the cylinder, the oscillating body moving within the housing between an admission position in which the products to be metered fill said swept volume and a delivery position different from the admission position and in which the products to be metered are evacuated from said swept volume, the piston being scraped by the housing when the piston leaves the delivery position, the oscillating body having a rotary movement so that the cylinder describes a circular arc between the admission and delivery positions, an input shaft arranged within said oscillating body, concentrically with respect to the movement of the oscillating body in the housing, a rod and crank system connecting the input shaft and the piston to impart reciprocating movement to the piston, and coordinating means for controlling the movement of the oscillating body and coordinating the movement of the piston with respect to the oscillating body.

4. A device according to claim 3, characterized by the fact that the coordinating means assure the immobility of the piston with respect to the oscillating body at least when the oscillating body leaves the delivery position.

5. The device according to claim 3, characterized by the fact that the coordinating means are formed of a double-acting cam arranged on the input shaft and a return shaft articulated on the housing, controlling the movement of the oscillating body.

6. A metering device according to claim 3, characterized by the fact that the piston emerges from the oscillating body in the delivery position, and by the fact that the upper face of the piston has a suitable shape so that, taking into account the relative movement of the piston with respect to the housing, it can be scraped by the edge of the housing.

7. A metering device according to claim 3, characterized by the fact that the device comprises a force-feed member for the products filling the cylinder in the feed position.

8. A metering device according to claim 7, characterized by the fact that the force-feed member includes a reservoir which feeds the cylinder by gravity, said reservoir having a circular bottom on the outer perimeter of which a feed orifice of the cylinder appears and being provided with stirring means arranged at least in the vicinity of the bottom.

9. A metering device according to claim 8, characterized by the fact that said stirring means include a disk pierced by holes of a diameter corresponding to that of the cylinder and arranged to move in a circle having a radius such that they all pass in succession opposite the feed orifice, and a flexible blade mounted in fixed position in the reservoir and provided with a head arranged opposite the admission orifice so as to deliver the material contained in said holes when each hole is presented to the admission orifice.

10. A metering device according to claim 3, including a force-feed member having a head which presses with a constant force in the direction of feeding the cylinder.

11. A metering device comprising a housing having admission and delivery ports, a body oscillating on an axis within said housing and having a cylinder formed therein, a piston movable within said cylinder and being presented alternately to said admission and delivery ports, a common drive for displacing the body relative to the housing and the piston relative to the cylinder, a cam driven by the common drive, an eccentric connecting the common drive and the piston and a cam controlled reciprocatory means mounted for reciprocation in the housing and connecting the common drive and the body for imparting movement to the body within the housing, the eccentric and cam coordinating the movement of the piston and the body so that the upper surface of the piston is scraped by the housing when the piston is moved from the delivery position toward the admission position.

12. A metering device as set forth in claim 11 including a force-feed head at the admission port which presses with a constant force in the direction of feeding of the cylinder at the admission port.

13. A metering device as set forth in claim 12 including an apertured feed means moving between the admission port and the head so that material contained within the apertures will be pressed with a constant force in the direction of feeding of the cylinder by the force-feeding head.

* * * * *